April 28, 1953 J. B. SINGEL ET AL 2,636,941
FREQUENCY SHIFT KEYING CIRCUITS
Filed April 25, 1950
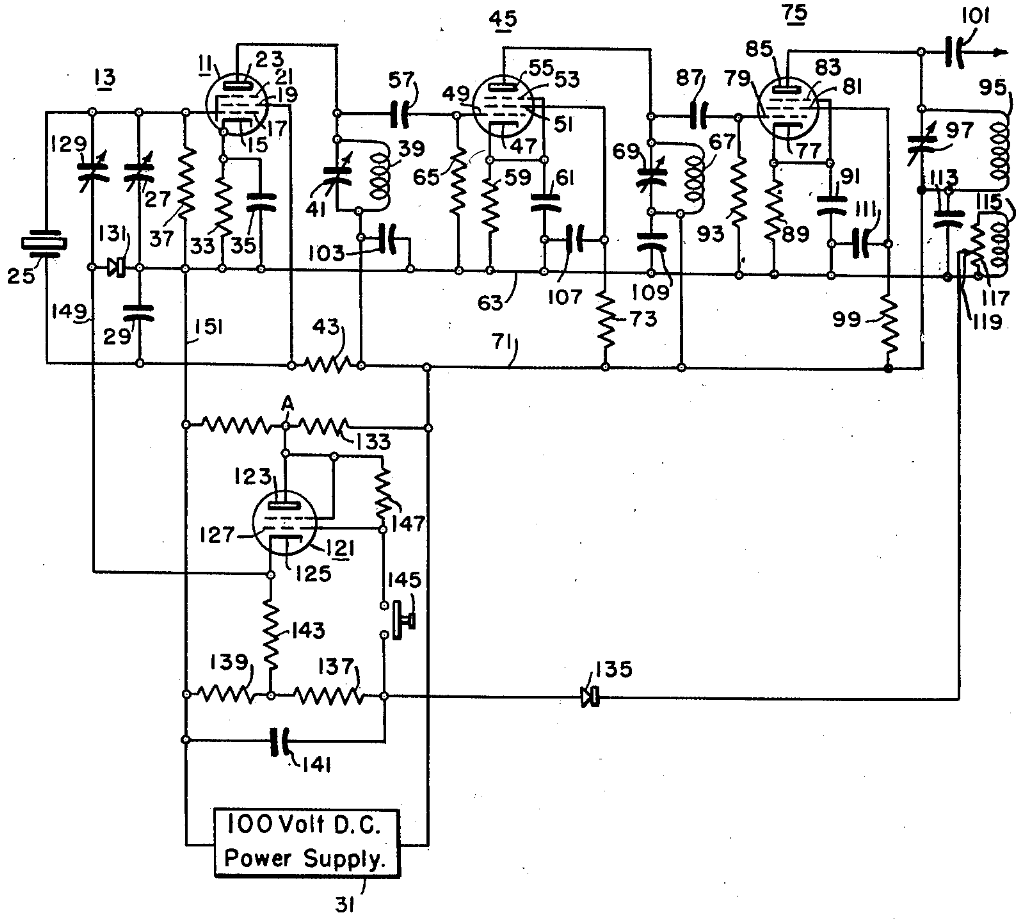
WITNESSES:
E. A. McCloskey
Wm. C. Groome
INVENTORS
John B. Singel, Robert E. Leister
and James R. Heck.
BY
F. E. Browder
ATTORNEY Patented Apr. 28, 1953

2,636,941

UNITED STATES PATENT OFFICE 2,636,941

FREQUENCY SHIFT KEYING CIRCUITS

John B. Singel, Robert E. Leister, and James R. Heck, Baltimore, Md., assignors to Westinghouse Electric Corporation, East Pittsburgh, Pa., a corporation of Pennsylvania Application April 25, 1950, Serial No. 157,918

4 Claims. (Cl. 178—66)

This invention relates to keying systems for radio frequency oscillators and more particularly to a frequency shift system for keying radio frequency oscillators.

An object is to provide an improved frequency shift system for keying radio frequency oscillators.

In the present invention frequency shift keying is accomplished by shifting the frequency of a crystal oscillator by a small amount. This is accomplished by connecting an extra capacitance across the crystal. The extra capacitance is connected across the crystal by a diode which is in series with a keying tube and a key. When the key is open the keying tube is conductive and the diode also conducts current and provides a low resistance connection between the crystal and the extra capacitance. This causes the crystal to oscillate at a lower frequency. When the key is closed the keying tube is connected to a bias obtained from the output of the oscillator. This bias renders the keying tube non-conductive and simultaneously applies a potential to the diode in such a direction as to increase the forward resistance of the diode to a value which will effectively electrically disconnect the extra capacitance from the crystal. This reduction in capacity across the crystal will slightly raise the frequency of the oscillator.

The oscillator system provided by this invention is required to operate from as low as 100 volts direct current without resorting to vibrators, rotating machinery, separate oscillator rectifiers for bias potential, or losing the equivalent in plate potential; the keying circuit requires passing only a very low current through external circuit closing contacts; and, the frequency shift must be accomplished by external contacts equivalent to a single pole single throw switch.

It is another object to provide a frequency shift keying system for a radio frequency oscillator which satisfies the above requirements.

It is a still further object to provide a frequency shift keying system for a radio frequency oscillator wherein keying bias is obtained from the output of the oscillator.

These and other objects are effected by our invention as will be apparent from the following description and claims taken in connection with the accompanying drawing forming a part of this application.

The figure of the drawing is a schematic illustration of a radio frequency oscillator system employing our invention.

Referring now to the drawing in detail, the reference numeral 11 represents an oscillator tube connected to a frequency determining circuit 13. The oscillator tube 11 has a cathode 15, a control grid 17, a screen grid 19, a suppressor grid 21, and a plate 23. The frequency determining circuit 13 comprises a crystal 25 shunted by serially connected capacitances 27 and 29. A 100 volt direct current power supply 31 has its negative terminal connected to the cathode 15 of the oscillator tube 11 through parallel connected resistor 33 and condenser 35. The network comprising the resistor 33 and the condenser 35 provides the proper bias for the grid 17 of the oscillator tube 11. The grid 17 of the oscillator tube 11 is connected to the cathode 15 through a resistor 37. The plate 23 of the oscillator tube 11 is connected to the positive terminal of the power supply 31 through the tuned circuit comprising inductance 39 and variable capacitance 41. The screen grid 19 of the oscillator tube 11 is connected to the positive terminal of the power supply 31 through dropping resistor 43.

An amplifier 45 having a cathode 47, a control grid 49, a screen grid 51, a suppressor grid 53 and a plate 55 is connected to the output of the oscillator tube 11. The output from the oscillator tube 11 is connected to the control grid 49 of the amplifier 45 through a coupling condenser 57. The cathode 47 of the amplifier 45 is connected to the negative terminal 63 of the power supply 31 through the parallel connected resistor 59 and condenser 61. The grid 49 is connected through resistance 65 to a potential divider which is explained hereinafter. The network comprising the resistor 59 and condenser 61 provides the proper bias for the grid 49. The plate 55 of the amplifier 45 is connected to the positive side of the power supply 31 through a network comprising an inductance 67 and the wiring 71. The inductance 67 and tuning condenser 69 provides a load impedance for the plate 55. The screen grid 51 of the amplifier 45 is connected to the positive terminal 71 of the power supply 31 through a dropping resistor 73.

A second amplifier 75, similar to the amplifier 45, having a cathode 77, a control grid 79, a screen grid 81, a suppressor grid 83 and a plate 85, is connected to the output of the amplifier 45. The output from the amplifier 45 is coupled to the control grid of the amplifier 75 through a coupling condenser 87. The cathode 77 of the second amplifier 75 is connected to the negative terminal 63 of the power supply through a network comprising a parallel connected resistor 89 and condenser 91. The control grid 79 of the second amplifier 75 is returned to negative line 63 through resistor 93. The plate 85 of the second amplifier 75 is connected to the positive terminal 71 of the power supply 31 through a load impedance network comprising an inductance 95 tuned by a variable condenser 97. The screen grid 81 of the second amplifier 75 is connected to the positive terminal 71 of the power supply 31 through a dropping resistor 99.

The output from the amplifier 75 is coupled to following stages of the system through coupling condenser 101. The following stages may be additional amplifier stages or an antenna system for radiating energy generated by the oscillator.

The suppressor grid of each of the tubes is connected directly to its respective cathode. The condensers 103, 107, 109, 111 and 113 provide bypass paths for radio frequency to the negative line 63.

An inductance coil 115 is inductively coupled to the inductance coil 95 in the output of the amplifier 75 and picks up some of the energy from the output of the amplifier 75. This inductance coil 115 is connected in series with a resistance 117 which is connected to the negative line 63. The resistance 117 is provided with a variable tap 119 for picking off voltage developed by the inductance coil 115.

A keyer tube 121 having a plate 123, a cathode 125 and at least a control grid 127, has its cathode 125 connected to a capacitance 129 in the frequency determining network, which has one of its plates connected to the conductor connecting the crystal 25 and the capacitance 27, and has its other plate connected to one side of a diode 131. The other side of the diode 131 is connected to condenser 27 opposite the plate connected to the junction of the crystal 25 and the connections of the condenser 129. The plate 123 of the tube 121 is connected to the positive terminal of the power supply 31 through a resistance 133.

The voltage induced in the inductance coil 115 is picked off the resistance 117 and rectified by a diode 135. This voltage appears across a potential divider comprising resistances 137 and 139. A condenser 141 is connected across the resistances 137 and 139 and provides a filter. The cathode 125 of the keyer tube 121 is connected to the junction point of the resistances 137 and 139 through a resistance 143. The grid 127 of the keyer tube 121 is connected to the negative end of the resistance 137 through a single pole single throw key 145. It will also be observed that the grid 127 of the keyer tube is connected to the plate 123 of the keyer tube 121 at point A through a high resistance 147.

To explain the operation of our oscillator system, assume that the circuit is adjusted until the potential of point A is 5 volts positive and key 145 is open. It is observed that plate 123, and control grid 127 will both have this magnitude of potential applied. The resistance 147 however, is a relatively high resistance. With these conditions existing, the keyer tube 121 will be conductive and current will flow from point A through the keyer tube 121 from the plate 123 to cathode 125, through conductor 149 to the diode 131 in the frequency determining network, to the negative terminal 63 of the power supply 31 through line 151, through the power supply 31 to the positive line 71 and through the resistance 133 back to the point A. The current under these conditions is approximately 5 to 10 milliamperes. This current reduces the forward resistance of diode 131 in the frequency determining network to approximately 50 ohms. This low resistance is substantially equivalent to a short circuit. Under this condition, the diode 131 conducts current and connects the capacitance 129 in parallel with the capacitance 27 and the frequency of the crystal 25 is shifted. The addition of the capacitance 129 in parallel with the capacitance 27 and the crystal 25 will slightly lower the frequency of oscillation of the crystal 25.

The radio frequency potential induced in the inductance coil 115 and picked off resistance 117 is rectified by the diode 135 and appears as a voltage across the potential divider comprising the resistors 137 and 139. The position of the variable contact 119 on the resistance 117 controls the magnitude of the voltage appearing across the resistors 137 and 139. In a practical set up, the variable contact 119 is adjusted to give approximately 15 volts across resistance 137 and 15 volts across resistance 139 with the negative end being adjacent the key 145.

When the key 145 is closed, a potential of 30 volts minus is applied to the control grid 127 to cut off the plate current, which ceases to flow through tube 121. This cessation of plate current flow causes the cathode 125 to change its potential from that of the negative terminal 63 of the power supply 31 to 15 volts negative which appears at the junction of resistors 137 and 139. This makes the net voltage on the grid 127 only 15 volts minus which is still sufficient to bias the grid 127 of the keyer tube 121 to cut off and stop the flow of plate current.

When the key 145 is closed, in addition to stopping the flow of plate current through the diode 131 in the frequency determining network, closing of the key also connects the cathode 125 of the keyer tube 121 to the junction of the resistors 137 and 139 which point is minus 15 volts below the negative terminal of the power supply 31. This negative potential is applied through resistance 143 to the diode 131 in the frequency determining network. Under these conditions, the voltage impressed across the diode 131 in the frequency determining network is now in the reverse direction from that impressed on the diode 131 with the key 145 open. Consequently, with the key 145 closed, the effective resistance of the diode 131 is several hundred thousand ohms. This high resistance is effectively an open circuit and electrically disconnects the capacitor 129 from across the frequency determining network. With the capacitor 129 disconnected from across the frequency determining network, the frequency determining network will oscillate at a higher frequency than when the key 145 is open.

It is seen that by means of a single contact key 145, the polarity of the potential on the diode 131 in the frequency determining network may be caused to reverse by opening and closing the key 145. This reversal of polarity on the diode 131 causes it to alternately connect and disconnect the capacitor 129 across the frequency determining network and thereby shift the frequency of oscillation of the network up and down. It is also seen that since the resistance 147 is a high resistance, the current passing through the contacts of the key 145 may be as low as a small fraction of a milliampere.

From the foregoing description taken in connection with the drawing, it is seen that we have provided an improved frequency shift keying system for keying an oscillator which operates from a low potential source of direct current by obtaining bias for operating the keyer tube from a portion of the oscillator output.

While we have shown our invention in only one form, it will be obvious to those skilled in the art that it is not so limited, but is susceptible to advance changes and modifications without departing from the spirit and scope thereof, and we desire, therefore, that only such limitations shall be placed thereon as are specifically set forth in the appended claims. For example, by means of diode 131, capacitor 129 is connected in parallel with 27. By means of another capacitor equivalent to 129, another diode equivalent to 131 and another keyer tube and associated circuits, this second capacitor could be electronically connected in parallel with capacitor 29 to give a still greater frequency shift of the crystal.

We claim as our invention:

1. In a frequency shift oscillator system, a frequency determining network comprising a first impedance, a second impedance adapted to be connected in parallel with said first impedance to shift the frequency of said frequency determining network, a diode connected between said first and second impedances, a keying tube connected to said diode in such manner that when said keying tube is made conductive said diode is also made conductive and connects said second impedance in parallel with said first impedance, a potential divider connected to the cathode of said keyer tube, means utilizing a portion of the output from said frequency determining network for developing a potential across said potential divider, a key connected between said potential divider and the grid of said keyer tube which upon closing applies simultaneously a potential to the grid of said keyer tube to render the same non-conductive and a potential to said diode in a direction to make said diode effectively a high impedance which electrically disconnects said second impedance from said first impedance.

2. In a frequency shift oscillator system, a frequency determining network comprising a permanently connected first impedance, a second impedance adapted to be connected in parallel with said first impedance to shift the frequency of oscillation of said frequency determining network, a diode connected between said first and second impedances for connecting said second impedance in parallel with said first impedance, a keying tube connected to said diode in such manner that when said keying tube is made conductive said diode is also made conductive and connects said second impedance in parallel with said first impedance, a potential divider, a rectifier connected to the output of said frequency determining network for rectifying a portion of the output from said frequency determining network, means for impressing the rectified output from said rectifier across said potential divider, a key connected to the negative end of said potential divider in such manner that upon closing of said key potential is applied simultaneously to the grid of said keying tube to render the same non-conductive and to said diode in such a direction as to effectively make said diode a high impedance which isolates said second impedance from said first impedance.

3. In a frequency shift oscillator system, a frequency determining network comprising a permanently connected first impedance, a second impedance adapted to be connected in parallel to shift the frequency of oscillation of said frequency determining network, a diode connected between said first and second impedances, a keyer tube connected to said diode in such manner that when said keyer tube is conductive said diode is also conductive and connects said second impedance in parallel with said first impedance, an amplifier connected to amplify the output from said frequency determining network, a potential divider, means comprising a rectifier for applying a portion of the output from said amplifier across said potential divider, and a key connected to the negative end of said potential divider and adapted when closed to apply a negative blocking potential to the grid of said keyer tube to render said tube non-conductive and simultaneously apply a negative potential to said diode in said frequency determining network in such a direction as to effectively make said diode a high impedance which isolates said first impedance from said second impedance.

4. A frequency shift keying system comprising an oscillator having a frequency determining network, said network including a reactive impedance element in series with a diode, means for applying potential to said diode in one direction to cause it to present a low impedance and in the opposite direction to cause it to present a high impedance, said means comprising a keyer tube having an anode, a cathode and a control grid, means rendering said tube normally conductive, means connecting said tube in series with said diode, a voltage divider, means for deriving a direct current bias potential from the output of said oscillator and applying said potential to said divider, means connecting a key between said grid and the negative terminal of said divider, means connecting the intermediate terminal of said divider to said cathode and to one side of said diode, and means connecting the positive terminal of said divider to the other side of said diode.

JOHN B. SINGEL.
ROBERT E. LEISTER.
JAMES R. HECK.

References Cited in the file of this patent

UNITED STATES PATENTS

| Number | Name | Date |
|---|---|---|
| 2,426,295 | Born | Aug. 26, 1947 |
| 2,462,181 | Grosselfinger | Feb. 27, 1949 |
| 2,474,261 | Leibe | June 28, 1949 |
| 2,492,791 | Finch | Dec. 27, 1949 |